Sept. 15, 1959  J. A. TE NUYL  2,904,417
PROCESS FOR THE PRODUCTION OF SYNTHESIS GAS AND THE LIKE
Filed Sept. 3, 1957
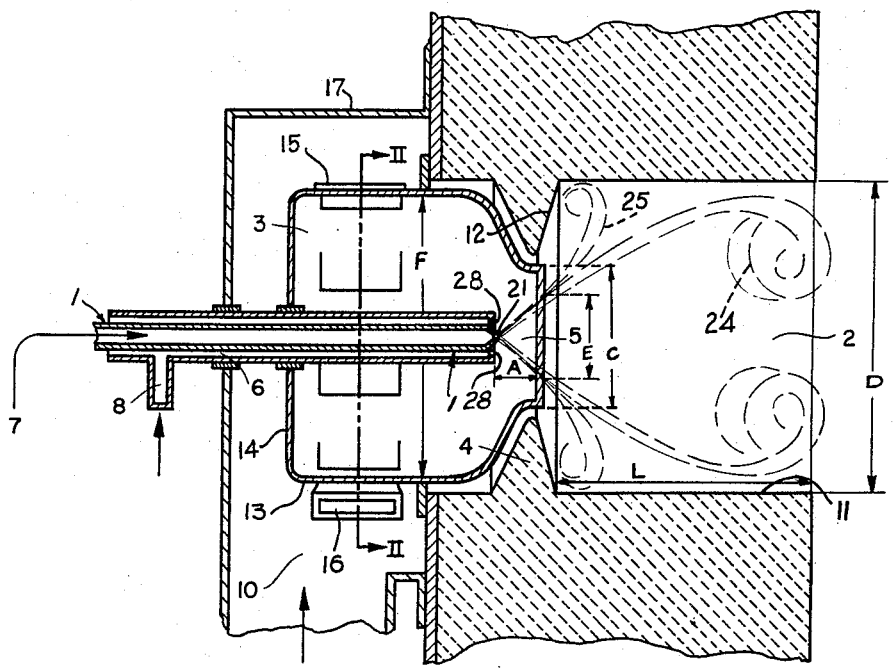
FIG. I
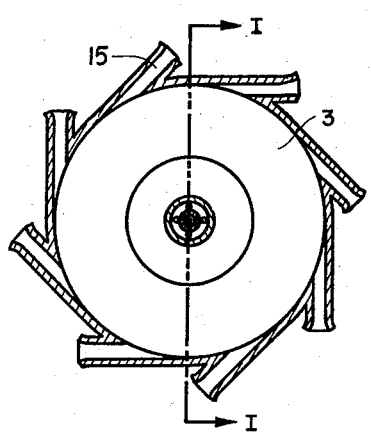
FIG. II
INVENTOR:
JOHANNES A. teNUYL
BY: William H. Myers
HIS AGENT

United States Patent Office 2,904,417
Patented Sept. 15, 1959

2,904,417

PROCESS FOR THE PRODUCTION OF SYNTHESIS GAS AND THE LIKE

Johannes A. Te Nuyl, Delft, Netherlands, assignor to Shell Development Company, New York, N.Y., a corporation of Delaware Application September 3, 1957, Serial No. 681,729

Claims priority, application Great Britain October 27, 1955

7 Claims. (Cl. 48—212)

This invention is concerned with a combustion process. More particularly, it is directed to an improved process for the production of mixtures of hydrogen and carbon monoxide with minimum soot formation.

It is known that the partial combustion of hydrocarbon materials results in a gaseous mixture consisting mainly of hydrogen and carbon monoxide. The gas mixtures obtained, however, nearly always contain soot since, when there is incomplete combustion, the formation of free carbon is practically unavoidable. Soot formation is considered to be a disadvantage since it requires separation of the gas mixtures therefrom and often this act of separation has proved to be difficult.

It is an object of the present invention to provide a process for the production of gaseous mixtures predominating in hydrogen and carbon monoxide and particularly of synthesis gas. It is a further object of the present invention to provide an improved process for the production of synthesis gas wherein soot formation is confined to a minimum and any soot which does form is easily removable from the gas mixture. It is a particular object of the present invention to provide a process wherein minimum soot formation is effected by control of the introduced gaseous oxygen pressure within a critically defined range.

Now, in accordance with the present invention, a process for the preparation of gas mixtures containing predominantly hydrogen and carbon monoxide is provided which entails the partial combustion of carbonaceous material in a stream of an oxygen-containing gas in a special type of apparatus as more fully defined hereinafter; the process comprising the steps of mixing the oxygen-containing gas and the carbonaceous material in such proportions as to effect only partial combustion thereof within a combustion area by such a method that the combustion is complete (insofar as the oxygen supply allows) within a combustion time less than about 5 and preferably 4 seconds. Minimum soot formation is effected in accordance with the claimed improvement in this process by maintaining the pressure of the oxygen-containing gas at the entry into the combustion area at at least 3 atmospheres gauge and preferably between about 3 and 30 atmospheres gauge. The soot formed under this set of conditions not only is small in quantity but is more easily removable from the combustion products than when lower oxygen gas pressures and longer combustion times are utilized.

More particularly, the present invention comprises a method for preparing a gas mixture containing predominantly hydrogen and carbon monoxide by partial combustion of a carbonaceous fuel in the presence of insufficient oxygen for complete combustion while maintaining the recited set of operating conditions and which utilizes a casing open at its outer end and closed at its inner end, and having an annular side wall formed with a plurality of circumferentially spaced tangential inlet slots extending longitudinally, a box enclosing said inlet slots, the steps of the process being as follows: a first fluid which may be either the carbonaceous fuel or an oxygen-containing gas is fed into the box throughout the length and periphery of the slotted side wall of the casing and through the slots tangentially into the casing, said first fluid being fed through the slots at an angular relation to the axis of the casing and with a velocity sufficient to form an annular rotating column of this first fluid advancing forwardly toward said open end. The quantity of the first fluid increases progressively along the length of the slots. The internal dimension of the annular first fluid column is progressively contracted in its course along the length of the slots, whereby the annular area of the column increases progressively in accordance with the increase of the quantity of the first fluid gas. A second fluid which may be either the carbonaceous fuel or the oxygen-containing gas (but not the same as the first fluid) is sprayed outwardly into said annular column of the first fluid near said open end of the casing. The resulting mixture rapidly expands in an outwardly moving rotating column by discharging with a rotating motion under a pressure of at least 3 atmospheres into a sharply enlarged elongate combustion zone having a side wall which is substantially a surface of revolution. The fuel-oxygen gas mixture is burned within the combustion zone during a combustion time less than about 5 seconds and usually less than 4 seconds.

Under the conditions as defined herein, it has been found that the pressure at which the fluids enter the combustion zone is critical insofar as soot formation is concerned. Moreover, by maintaining pressure of the fluids above 3 atmospheres and preferably between 3 and 30 atmospheres, it has been found that any soot which is formed is easily removable from the gaseous products. It is preferred, moreover, that the pressure under which the fluids enter the combustion chamber is in excess of 10 atmospheres.

A preferred device for carrying out the process of the present invention is described herein with reference to the accompanying drawing. The combustion device comprises a combustion chamber that is open at the front and has a closed side wall and a rear wall, there being an opening in the rear wall, the effective area of which is constricted relatively to the diameter of the combustion chamber and establishes communication with an air chamber, the air chamber having peripheral air supply means or openings, such as tangential slots, for admitting air (in some instances it may be desirable to introduce a gaseous fuel here and air or oxygen through the later mentioned nozzle) with a rotary motion to form an advancing rotating current or annulus of air that is introduced into the combustion chamber forwardly through said opening, and a fluid pressure oil atomizing nozzle for discharging the fuel divergingly into the annulus. As previously mentioned, there may be operations where the air is advantageously admitted through the nozzle and the carbonaceous fuel to the periphery of the chamber. It is important that the axial length of the side wall of the combustion chamber be in excess of 0.8 times the inside diameter of the combustion chamber measured at the rear, e.g., from 0.8 to 1.5 times the inside diameter. The opening in the rear wall and the front end of the air casing together form an air inlet which is advantageously circular and best results are obtained when the diameter thereof is from 0.15 to 0.45 times the diameter of the combustion chamber, but a somewhat larger range of air inlet sizes, such as from 0.25 to 0.67 times the diameter of the combustion chamber, can be used. The closed side walls of the combustion chamber are advantageously made of refractory material; the combustion chamber, the air inlet at the rear wall and the air chamber are all substantially formed as surfaces of revolution, and the side walls of the combustion chamber are substantially tubiform, i.e., they do not diverge greatly toward the front and may be cylindrical.

According to one specific embodiment, the apparatus involves a special relation between the combustion chamber, the air chamber, the effective opening in the rear wall of the combustion chamber that constitutes the air inlet to the chamber, and the atomizing nozzle, as will be explained hereinafter. Briefly, the effective opening in the rear wall is smaller than the internal diameter of the main portion of the air chamber so as to form a throat or constricted passageway between the chambers. The fluid pressure atomizing nozzle in this special relation may be of any suitable type that emits a hollow diverging, substantially conical spray of atomized or powdered fuel; it is situated at or near the central axis of the air chamber and back from the rear wall of the combustion chamber at the distance required to cause the conical spray to pass close to the wall of the throat without touching it, the spray cone angle being wide enough to cause the cone to intersect the side wall of the combustion chamber. It should be understood that reference is herein made to the spray cone (as distinguished from the conical spray) as a geometrical shape without implying that the fuel drops actually impinge against the chamber wall. By making the side walls of the combustion chamber sufficiently long in relation to the inside diameter of the combustion chamber as explained above, one insures the formation therein of double flame vortices adjacent the opening in the rear wall, including an inner eddy or whirl inside of the conical spray and an outer eddy or whirl between the combustion chamber side wall and the conical spray, as described in the patent to Van den Bussche, No. 2,515,845. These vortices of flame and flame gases are highly effective in bringing the atomized oil in the spray rapidly to the ignition temperature, thereby stabilizing the flame and insuring complete combustion.

According to a further feature of the preferred apparatus, which is particularly useful in a burner having the preferred geometric and dimensional relations described elsewhere in this specification but which finds application also in burners that depart from these relations, a substantially cone-shaped air guide is provided coaxially within the air casing with the narrower part of the guide near the atomizing nozzle and the widening part extending axially in a direction away from the combustion chamber over at least the major portion of the axial extent of the air casing that is provided with tangential air inlets. This guide is formed as a surface of revolution and forms a radially inner boundary for the annulus of rotating air that is introduced from the tangential air inlets and thereby prevents the formation of energy-consuming eddies. It will be understood that the cross section of the annular space left within the air casing between the periphery thereof and the air guide increases in the axial direction toward the air inlet to the combustion chamber, so as to provide an annular air flow channel of gradually increasing cross-sectional area; this increase in area is in conformity to the increase in the quantity of air flowing axially through the chamber. The latter increase is caused by the influx of air through the tangential inlets over the entire axial extent that is provided with such inlets. Thus, the provision of the cone tends to reduce variations in the axial flow rate of the air over the air casing, and to eliminate dead angles or pockets where eddies are apt to occur.

The air guide need not be precisely a frustum of a cone; an air guide formed as a surface of revolution generated by a generatrix that is slightly curved in either direction may also be used. An air guide curved outwardly (convex away from the axis) has been found to give very good results.

As a further means of reducing the flow resistance of the air casing, the tangential air inlet may be formed between tangentially directed stream-lined blades that constitute the outer wall of the air casing.

Generally, the hydrocarbon will be introduced into the combustion device through the centrally placed atomizing nozzle and the air or oxygen, or possibly oxygen enriched air, will be introduced to the periphery of the air chamber of the combustion device as previously described. However, there may be instances where it will become desirable to alter the manner of introduction of the carbonaceous material and the oxygen-containing gas. For instance, where the hydrocarbon is normally gaseous in form such as light petroleum distillation tops comprising hydrocarbons such as propane, butanes, butylenes and the like, the volume of such hydrocarbons is so large with respect to the volume of the oxygen it will frequently become advantageous to reverse the points of introduction and admit the hydrocarbon gaseous material to the periphery of the air casing in which case the oxygen-containing gas will be introduced through the centrally disposed nozzle. This reverse arrangement to the normal for introduction of the material will frequently provide for a better mixing of the reaction components, resulting in a decrease in soot formation. Furthermore, with an improved mixing of the components there is less likelihood of objectionably high temperatures being reached adjacent the refractory lining of the combustion chamber. Hydrocarbons having normal boiling points below 120° C. are more suitable for this reverse periphery introduction, rather than the still higher boiling materials which will preferably be admitted to the combustion device through the centrally disposed fluid pressure atomizing nozzle.

The manner in which the various elements cooperate to achieve the objects of the invention will be explained further with reference to the accompanying drawings forming a part of this specification and illustrating certain specific embodiments which may be used in the process of the invention, wherein:

Fig. I is a vertical longitudinal section through one embodiment of a burner according to the invention; and Fig. II is a transverse section taken on line 2—2 on Fig. I.

In the following description of the combustion device illustrated in Figs. I and II, the carbonaceous material is described only as being introduced through the atomizing nozzle and the air or oxygen-containing gas is admitted to the periphery of the apparatus. It should be borne in mind as explained earlier and as shown in Example II, the hydrocarbon fuel may be introduced to the device at its periphery and in which instance the air will be centrally introduced through the nozzle.

Referring to Figs. I and II in detail, there is shown a substantially cylindrical combustion chamber 2, the walls 4 of which are made of refractory material having the relative dimensions of length to diameter shown and provided with an annular ridge 12 forming part of the rear wall of the combustion chamber. An air casing 13 is disposed in the rear of the combustion chamber in axial alignment therewith and defines within itself an air chamber communicating at the open front thereof with the combustion chamber. The air casing is closed at the rear by a wall 14 and the outline of the casing is mainly cylindrical, the peripheral side wall being provided with a plurality of circumferentially spaced tangential air inlet slots 15 that are defined by tangentially disposed walls and may have outwardly enlarged mouthpieces 16. The air casing, therefore, constitutes a generally cylindrical tuyere. The rear portion of the air casing is enclosed by an air box 17 having an inlet duct 10 for admission of combustion air under suitable pressure as described hereinafter.

It is highly advantageous to shape the air casing with a constriction at the front providing an orifice C that reduces the effective area of the opening in the wall 12 and constitutes the air inlet to the combustion chamber. Owing to the tangential entry of the air through the slots into the air chamber, the air moves rotatingly within the air chamber as an annulus toward the orifice C, and since the diameter of this orifice is smaller than that of the slotted part of the air casing, the rotational speed of the air increases as the air flows into the orifice. Thus, assuming that friction can be neglected, the circumferential velocity component is theoretically inversely proportional to the radius on which the air moves, so that when the diameter of the orifice C is half of that of the slotted part, the circumferential velocity of the air at the edge of the orifice is twice that of the air entering the air chamber through the slots. In general, it is preferred to have F, the diameter of the slotted part of the casing, at least 1.5 times the diameter C, that of the orifice, e.g., 2.25 times such diameter as in the illustrated embodiment, ratios smaller than about 3 being preferred. The orifice C constitutes an opening in the rear wall of the combustion chamber 2, which wall is made up mainly of the annular ridge 12, and in part by the air casing. This opening should preferably have a diameter related to D, the diameter of the combustion chamber as previously stated, e.g., it may be 0.42 times said diameter as shown. It is evident that the air advances as a rotating annulus and is admitted forwardly into the combustion chamber at the margin of the orifice, which is spaced inwardly from the side wall of the combustion chamber.

A tubular atomizer-holder 1 extends in through the air box 17 and rear wall 14 and carries a fluid pressure atomizer 21 at the front end thereof, the atomizer being of any suitable type emitting a hollow conical spray 5, the liquid fuel being admitted under pressure at 7. Although an atomizer operating exclusively by fuel pressure is to be preferred, because a fine spray can thus be obtained in a simple manner, it is also possible to use an auxiliary atomizing fluid, such as air or steam, on condition that the resultant spray is a hollow, substantially conical jet. Such atomizers being known per se, and forming no part of this invention, no further description thereof is deemed to be necessary herein; one form of atomizer using only the pressure of the fuel for atomization is disclosed in U.S. Patents Nos. 1,007,793 and 2,323,001 and a form employing steam under pressure for atomization is shown in U.S. Patent No. 1,980,132. The term "fluid pressure atomizing nozzle," therefore, is used generically to denote nozzles wherein atomization is effected by the pressure of any fluid supplied to the nozzle.

The atomizer 21 is situated at such a point in the air chamber that the conical fuel spray delivered by the atomizer enters the combustion chamber near the edge of the orifice 19 without actually impinging against it. In general, it was found to be important to cause E, diameter of the conical spray at the transverse plane at which the spray comes closest to the orifice edge, e.g., in the plane, where the spray emerges from the opening in the embodiment shown, to be between 0.85 and 1.0 times the diameter C of orifice. It should be noted that this does not require that the apex angle $\theta$ of the initial spray be as small as that required by the equation $$2A \tan \frac{\theta}{2} = C$$

A being the backward displacement of the atomizer from the forward plane of the orifice, for the reason that the rotating air column deforms the spray so as to diminish the cone angle. The cone angle must be wide enough to make the spray cone, when extended beyond the orifice, intersect the side wall 11 of the combustion chamber 2.

When the device is placed into operation the spray of fuel passing the edge of the orifice C is seized extremely forcibly by the rotating air annulus entering the combustion chamber 10 through the orifice and a very intimate mixing of the fuel and air takes place, which promotes ignition and combustion in the combustion chamber. The wall of the combustion chamber, which it hot when the device is in operation, imparts heat to the fuel by radiation and thus promotes evaporation, vaporization and ignition and combustion of the latter. Furthermore, however, the shape of this chamber is such that, as indicated in the drawing, both inside and outside the fuel cone torus-like vortices or whirls are formed, as indicated at 24 and 25, respectively, in the drawing. These annular vortices are situated on the inside and outside, respectively, of the air annulus and extend close to the opening in the orifice. Of these, particularly the outermost whirl 25 leads an already burning mixture back to the place where ignition of the newly admitted fuel is to take place and thus promotes rapid ignition of the fuel entering the combustion chamber. The constriction between the combustion and air chambers, formed mainly by the annular ridge 12, is therefore important not only for obtaining a high rotational air velocity but also for a quick propagation of the ignition, whilst it also prevents incompletely burnt particles from the combustion chamber from returning to the air chamber, where they would cause a coke deposit to be formed upon the cold parts. The passage of the conical fuel spray close to the orifice wall is important to insure good mixing and further to form a screen preventing the influx of flames and incompletely burnt particles into the part of the air chamber behind the spray. The flame characteristics described are the result of arranging the combustion chamber and the opening in the rear wall thereof with the dimensional relations indicated above.

In practice, it has been found that the ratio of L, the length of the combustion chamber side wall, to D, the diameter at the rear, is advantageously close to one. The intense propagation of the combustion process causes it to take place almost entirely inside the combustion chamber 2; this is particularly important where it is undesirable that the part to be heated should be exposed to intensive flame radiation. This may occur, for instance, in tubular stills for heating liquid hydrocarbons or other liquids, where local overheating of a tube by fierce radiation may cause cracking of the hydrocarbons or decomposition or undesired chemical reactions within the liquids, and thereby give rise to internal deposits of coke and the like, diminished cooling of the tube at that point, increased overheating and, finally, burning through the tube. The short, compact form of the flame has a further advantage where it is desired to limit the space required for combustion as much as possible, for example, in gas turbine installations.

It has been found that a further advantage of the construction described is that combustion can be effected with a decreased quantity of excess air, that is, with a high effiiciency; the $CO_2$ content of the flue gases can with this burner be increased almost to the theoretical maximum. The device is also very suitable for automatic operation.

The atomizer-holder 1 may be surrounded by a burner tube 6 providing an annular space to which combustion gas can be admitted at 8. This gas can be discharged through openings 28 near the atomizer. It has been found that a combustible gas can be burned either together with a liquid fuel or separately. The gaseous fuel can be used when there is a temporary shortage of liquid fuel.

The oxygen-containing gas supplied to the combustion area preferably consists either of substantially pure oxygen or air to which, if desired, additional oxygen may be added. The amount of oxygen to be used will be smaller than the quantity required for the complete combustion of the carbonaceous material which comprises either coal or a petroleum hydrocarbon material. When heavier hydrocarbons are utilized as the initial combustible substance, the oxygen used may be mixed with steam, before being passed into the reaction chamber. Usually a mixture of approximately one part of oxygen with .5–2 parts by weight of steam is supplied for the partial combustion of heavy products. Preferably, approximately 1–1.5 kilograms of oxygen is used per kilogram of carbonaceous substance.

The reaction is carried out at a temperature of 1200–1500° C. and preferably between 1300 and 1400° C. The pressure used is higher than about 3 atmospheres and is preferably higher than 10 and up to 30 atmospheres. The pressure used depends in part on the pressure at which the gas mixture formed in the partial combustion process is to be further utilized. Thus, the combustion reaction is carried out at elevated pressures if the resulting gas mixture formed is used for an ammonia synthesis, since the latter is carried out at very high pressure.

When the pressure is greater than about 3 atmospheres, the advantage obtained is that the minor amount of soot which may be present in the resulting gas mixture may be very readily removed by scrubbing with water, as compared to the more difficult removal of the soot formed when the process is operated at lower pressures. The intimate contact obtained by the use of the present process is such that the partial combustion lasts for less than about 5 seconds, generally less than 4 seconds. Thus, the short reaction time is essential for the prevention of undesired side reactions. The gas mixture formed is preferably rapidly cooled. Such a short reaction time is possible by the use of the apparatus described above and when utilizing fluid pressures in excess of 3 atmospheres, since there is an intimate mixing in the reaction chamber immediately after the introduction of the reaction components and also an immediate combustion of the reaction mixture obtained.

The carbonaceous material may vary from gaseous products such as low molecular weight hydrocarbons such as gaseous hydrocarbons to highly viscous oils such as residual fuel oils, asphalts, coal tars and even to powdered pitches, coal and the like. When heavier hydrocarbon products are involved, the specific gravity may lie, for example, between about 0.90 and 1.05. The viscosity may preferably vary between that of a gas oil and that of an asphalt with a penetration of 10–20 at 25° C. Heavy products of this type are preheated before being atomized. The mixture of oxygen-containing gas and steam supplied is also preferably preheated before being fed into the combustion chamber.

In an operation where the hydrocarbon fuel is introduced to the combustion device in a gaseous state and through the peripheral slots previously described, the oxygen for the partial combustion is preferably substantially pure oxygen or air to which additional oxygen has been added. If desired, the oxygen or oxygen-enriched air may contain steam. If the hydrocarbons are admitted into the combustion chambers mixed with steam, generally it will not be desirable to introduce the oxygen or oxygen-enriched air accompanied by still more steam. The quantity of oxygen to be used will of course have to be smaller than the quantity required for complete combustion of the hydrocarbon fuel. The ratio by weight of steam to hydrocarbon used may vary greatly and is preferably in the range of from 1:5 to 1:1.5. If the hydrocarbons which are introduced peripherally to the combustion device do not exist at the ambient temperature in a gaseous state, it will be necessary to first heat them to provide a gaseous form suitable for such an introduction. The oxygen or oxygen-containing gas and the steam may be introduced together into the reaction space at an elevated temperature, say 150–500° C. The oxygen or the oxygen-enriched air is preferably admitted to the combustion chamber with a rotating movement in the direction of rotation of the gaseous hydrocarbons. Such rotating movement may be had by causing the oxygen or the oxygen-enriched air to describe a helical path through the nozzle of the supply pipe 1 as by providing angular grooves therein.

*Example I*

An apparatus of the design shown in Figs. I and II, the combustion chamber of which was 160 cm. long and had a diameter of 40 cm., was used for the partial combustion of a high sulfur residual fuel oil with a viscosity of 3500 sec. Redwood I at 37.8° C. Preheated oxygen and superheated steam, preheated to about 400° C., were passed into the combustion chamber under a pressure of 20 atmospheres and at a temperature of about 1300° C. For each 100 kg. of oil supplied 85 cubic meters (measured at standard temperature and pressure) of oxygen and 90 kg. of steam were supplied to give 310 cubic meters of a gas mixture having approximately the following composition:

| | Vol. percent |
|---|---|
| $H_2S$ | 0.8 |
| $CO_2$ | 11.8 |
| $CO$ | 37.4 |
| $H_2$ | 48.1 |
| $CH_4$ | 0.6 |
| $N$ | 1.3 | and a small amount of carbon black (soot). After quenching with water (or passage through a waste boiler) the gas mixture was scrubbed with 9 cubic meters of water. The gas mixture left the scrubber free from carbon black and containing only 0.01 vol. percent of $H_2S$.

When the above apparatus is utilized together with the same oil and temperature conditions as described above, the sole difference being that the oxygen-containing gas is passed into the combustion chamber under a pressure of about 1.5–2 atmospheres, it is found that the resulting hydrogen-carbon monoxide mixture not only contains substantially more soot, but that much more extensive scrubbing with water is required in order to remove the soot from the gas.

*Example II*

An apparatus of a design shown in Figs. I and II was used for the partial combustion of a volatile hydrocarbon mixture which had been obtained by the distillation of Kuwait oil. The distillate used had a specific gravity of 0.668 and an initial boiling point (ASTM) of 37° C. and a final boiling point (ASTM) of 119° C. The hydrocarbon mixture contained 3.3% by weight of butane, with the rest being higher hydrocarbons. Paraffinic hydrocarbons made up 86.0% by weight of the mixture, naphthenes 9% by weight and aromatics 5% by weight. In the two runs of this example, the hydrocarbon material was introduced in a gaseous form along with superheated steam to the periphery of zone 3 via the encompassing cylindrical tuyere. Oxygen was admitted to the combustion device through the centrally disposed supply line 7. The admission of the steam along with the hydrocarbon assists in the supression of soot formation. The quantity of steam used as illustrated by the runs A and B reported in the table below has a direct bearing on the formation of the soot. In both runs the reaction temperature was approximately 1300° C.

|  | A | B |
|---|---|---|
| Pressure in the apparatus (kg. per sq. cm.) | 19 | 18 |
| Temperature to which the hydrocarbon mixture was preheated (° C.) | 390 | 360 |
| Temperature to which the steam was preheated (° C.) | 390 | 360 |
| Supply of hydrocarbon mixture (kg. per hour) | 100 | 100 |
| Supply of oxygen (normal cubic meters per hour) | 95 | 92 |
| Supply of steam (kg. per hour) | 65 | 40 |
| Purity of the oxygen used (mol. percent) | 99.8 | 99.8 |
| Composition of the gas formed (in dry state): |  |  |
| Hydrogen (mol. percent) | 53.8 | 53.2 |
| Methane (mol. percent) | 1.3 | 1.2 |
| Carbon monoxide (mol. percent) | 35.5 | 39.2 |
| Carbon dioxide (mol. percent) | 9.0 | 6.0 |
| Nitrogen (mol. percent) | 0.4 | 0.4 |
| Quantity of soot (percent by weight) | 0.7 | 2.6 |
| Duration of the reaction (sec.) | 2.5 | 2.5 |

This is a continuation-in-part of copending application Serial No. 617,132, filed October 19, 1956, now abandoned.

I claim as my invention:

1. In a method of preparing gas mixtures containing predominantly hydrogen and carbon monoxide by partial combustion of a mixture of a first and a second fluid, one being a carbonaceous fuel and the other an oxygen-containing gas, the quantity of the oxygen-containing gas being insufficient for complete combustion of the fuel, wherein the first fluid is fed tangentially into a first zone having a boundary of a surface of revolution with a velocity sufficient to form an annular rotating column of said first fluid advancing forwardly toward an open end of said zone, and wherein there is an increase in the quantity of the first fluid making up the rotating column along at least a portion of its travel and wherein there is a gradual reduction in the cross section of said annular rotating column to the cross section of the open end of said zone and wherein there is an injection of the second fluid outwardly into said annular column of the first fluid near said open end of the first zone and wherein there occurs a rapid expansion of the outwardly moving, rotating column of the first fluid upon the discharging of the resulting fuel-oxygen mixture into a sharply enlarged combustion zone having a boundary of substantially a surface of revolution, the improvement comprising introducing said fuel-oxygen mixture into the enlarged combustion zone under a pressure of at least 3 atmospheres and therein burning the mixture in less than 5 seconds.

2. A method according to claim 1 wherein the oxygen-containing gas is air and wherein it is the first fluid.

3. A method in accordance with claim 1 wherein the first fluid is a volatile hydrocarbon mixture.

4. A method according to claim 1 wherein the oxygen-containing gas is the first fluid and it is fed into the combustion zone at a pressure in the range of between 3 and 30 atmospheres.

5. A method according to claim 1 wherein the carbonaceous fuel is a residual petroleum feed oil and said fuel oil is the second fluid.

6. A method in accordance with claim 1 wherein 1–1.5 kilograms of oxygen is introduced per kilogram of the carbonaceous fuel and the combustion is carried on at a temperature in the range of 1200–1500° C.

7. A method in accordance with claim 1 wherein the first fluid is a gaseous hydrocarbon in admixture with steam.

References Cited in the file of this patent

UNITED STATES PATENTS

| 2,625,466 | Williams | Jan. 13, 1953 |
| 2,659,662 | Heller | Nov. 17, 1953 |
| 2,660,521 | Teichman | Nov. 24, 1953 |
| 2,806,517 | Te Nuyl | Sept. 17, 1957 |